US012370897B2

(12) United States Patent
Landry

(10) Patent No.: US 12,370,897 B2
(45) Date of Patent: Jul. 29, 2025

(54) POWER INDICATOR FOR ELECTRIC VEHICLE

(71) Applicant: TAIGA MOTORS INC., Lasalle (CA)

(72) Inventor: Jean-Philippe Landry, Terrebonne (CA)

(73) Assignee: TAIGA MOTORS INC., Lasalle (CA)

( * ) Notice: Subject to any disclaimer, the term of this patent is extended or adjusted under 35 U.S.C. 154(b) by 0 days.

(21) Appl. No.: 18/126,083

(22) Filed: Mar. 24, 2023

(65) Prior Publication Data

US 2023/0311657 A1    Oct. 5, 2023

Related U.S. Application Data

(60) Provisional application No. 63/325,205, filed on Mar. 30, 2022.

(51) Int. Cl.
*B60K 35/00* (2024.01)
*B60L 7/10* (2006.01)

(52) U.S. Cl.
CPC ............. *B60K 35/00* (2013.01); *B60L 7/10* (2013.01); *B60L 2240/52* (2013.01)

(58) Field of Classification Search
CPC ........ B60K 35/00; B60K 35/22; B60K 35/29; B60K 35/65; B60K 35/81; B60K 35/60; B60K 2360/168; B60K 2360/169; B60K 2360/174; B60K 35/213; B60K 35/28; B60L 2240/52; B60L 7/10; B60L 58/12; B60L 2240/423; B60L 2240/425; B60L 2240/545; B60L 2250/10; B60L 2250/16
USPC ........................................................ 320/134
See application file for complete search history.

(56) References Cited

U.S. PATENT DOCUMENTS

| 7,414,544 | B2 | 8/2008 | Oltheten |
| 9,035,802 | B2 | 5/2015 | McCollough |
| 9,168,860 | B2 | 10/2015 | Yamamura |
| 9,950,620 | B1 | 4/2018 | Hanna |
| 2012/0049797 | A1* | 3/2012 | Tamaki ................ B60L 53/16 320/109 |

(Continued)

FOREIGN PATENT DOCUMENTS

| CA | 2595654 C | 5/2015 |
| EP | 3309079 B1 | 8/2019 |
| EP | 3725579 B1 | 8/2021 |

OTHER PUBLICATIONS

Quora, As a driver, how does the instrument panel and central screen of a Tesla compare to the dashboards of other cars in providing useful information?, https://www.quora.com/As-a-driver-how-does-the-instrument-panel-and-central-screen-of-a-Tesla-compare-to-the-dashboards-of-other-cars-in-providing-useful-information, accessed on Jan. 26, 2022.

(Continued)

*Primary Examiner* — Nha T Nguyen
(74) *Attorney, Agent, or Firm* — Norton Rose Fulbright Canada LLP

(57) ABSTRACT

Power indicators for visually indicating a current amount of power generated by a powertrain of an electric vehicle are provided. The power indicator includes a first visual indication indicating the current amount of power generated by the powertrain, and a second visual indication dynamically indicating a variable power limit on the power that can be generated by the powertrain. The variable power limit is variable based on a variable operating parameter of the powertrain.

21 Claims, 10 Drawing Sheets

(56) References Cited

U.S. PATENT DOCUMENTS

| | | | |
|---|---|---|---|
| 2014/0032029 A1 | 1/2014 | Hirasawa | |
| 2019/0111788 A1* | 4/2019 | Fujita | B60L 3/12 |
| 2019/0293721 A1* | 9/2019 | Tsutsumi | H01M 10/488 |
| 2019/0350130 A1* | 11/2019 | Spitz | B60W 50/14 |
| 2020/0384862 A1* | 12/2020 | Fracchia | B60K 35/00 |
| 2022/0161681 A1* | 5/2022 | Bock | B60L 58/25 |

OTHER PUBLICATIONS

Tesla Motors Club, What is the orange dotted line on the charge indicator/speedometer?, https://teslamotorsclub.com/tmc/threads/what-is-this-orange-dotted-line-on-the-charge-indicator-speedometer.14887/, accessed on Jan. 26, 2022.

Tesla Motors Club, Yellow dotted line on power meter, https://teslamotorsclub.com/tmc/threads/yellow-dotted-line-on-power-meter.13681/, accessed on Jan. 26, 2022.

Tesla Motors Club, Energy Graph with (!) Indicator Appears Intermittently, https://teslamotorsclub.com/tmc/threads/energy-graph-with-indicator-appears-intermittently.81222/, accessed on Jan. 26, 2022.

Bell, Flying With Ease Bell 429 Preflight, Jan. 4, 2016, https://www.youtube.com/watch?v=bMh5byLm8Nk&t=230s&ab_channel=Bell, accessed on Feb. 22, 2022.

* cited by examiner

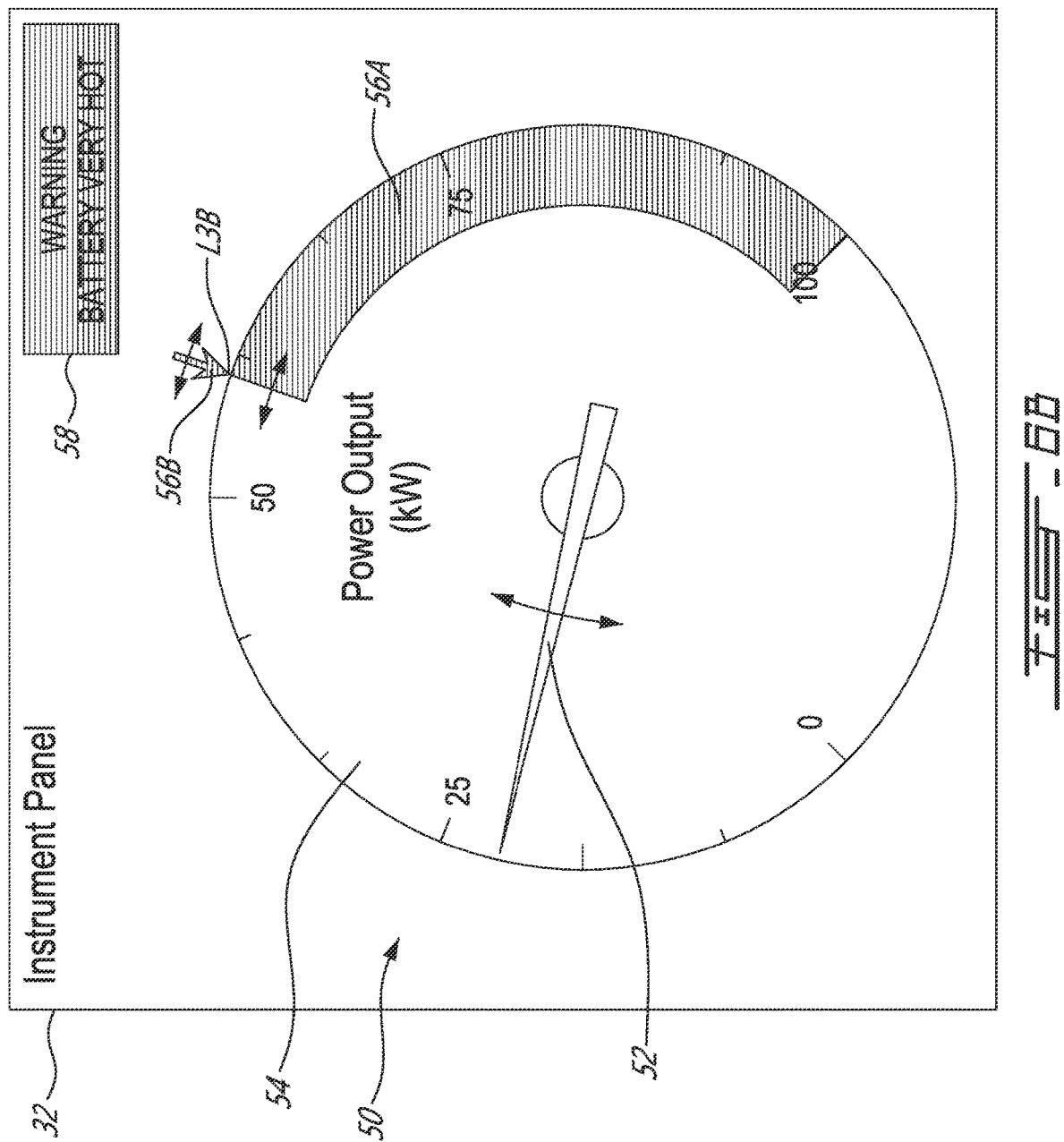

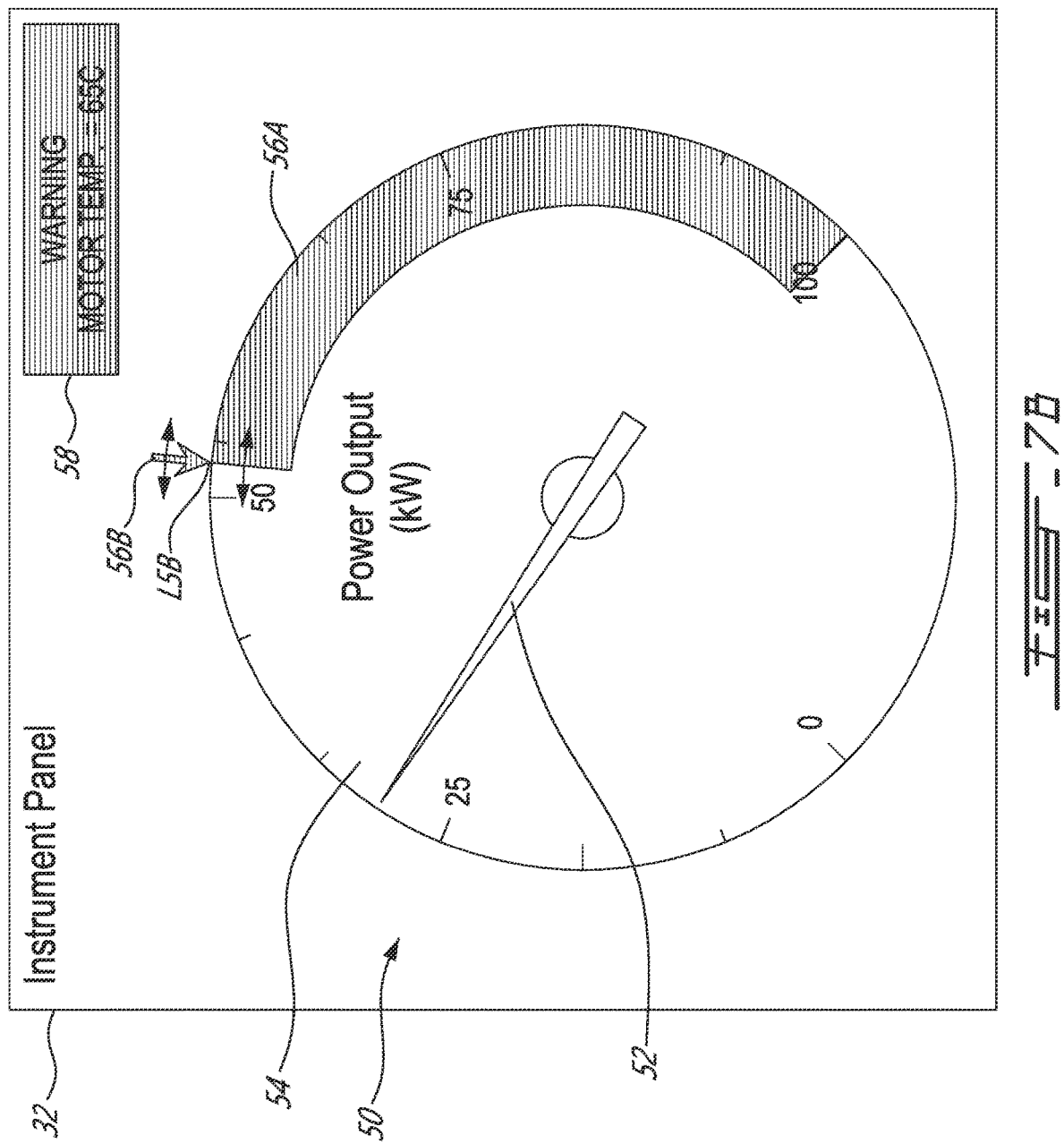

POWER INDICATOR FOR ELECTRIC VEHICLE

CROSS-REFERENCE TO RELATED APPLICATION

This application claims priority from U.S. Provisional Patent Application No. 63/325,205, filed Mar. 30, 2022, which is incorporated by reference in its entirety herein.

TECHNICAL FIELD

The disclosure relates generally to electric vehicles, and more particularly to power indicators of electric vehicles.

BACKGROUND

The operation of electric vehicles may be restricted by operational limits in some situations such as when a motoring battery is too cold. The application of an operational limit on an electric vehicle may result in the electric vehicle not behaving as would normally be expected by an operator of the electric vehicle. Improvement is desirable.

SUMMARY

In one aspect, the disclosure describes an electric vehicle comprising:
- a powertrain including an electric motor for propelling the electric vehicle and a battery for powering the electric motor;
- a power indicator to visually indicate an amount of power generated by the powertrain along a scale extending between a first scale value and a second scale value, the second scale value being larger than the first scale value;
- a sensor operatively connected to the powertrain to sense a parameter of the powertrain; and
- a controller operatively connected to the sensor and to the power indicator, the controller being configured to:
  cause the power indicator to visually indicate a power limit on the power that can be generated by the powertrain along the scale of the power indicator, the power limit being between the first scale value and the second scale value, the power limit being associated with a value of the parameter of the powertrain; and
  cause the power indicator to visually indicate a change in the power limit along the scale to reflect a change in the value of the parameter of the powertrain.

Causing the power indicator to visually indicate the change in the power limit may include causing the power indicator to display a gradual movement of a visual indication along the scale as a function of the parameter.

The visual indication is a first visual indication, and the controller may be configured to cause a second visual indication to be provided to an operator of the electric vehicle when the power limit is visually indicated on the power indicator. The second visual indication may be indicative of the parameter of the powertrain.

The first visual indication and the second visual indication may be of a same color corresponding to an alert level associated with the power limit.

The visual indication may include a band having a length extending along a portion of the scale. The gradual movement of the visual indication may include a gradual change in the length of the band.

The gradual movement of the visual indication may be substantially synchronized with the change in the value of the parameter of the powertrain.

The power limit may be indicative of a maximum amount of power that can be output from the powertrain during propulsion of the electric vehicle.

The power limit may be indicative of a maximum amount of power that can be generated by the powertrain during regenerative braking.

The controller may be operatively connected to the powertrain. The controller may be configured to control the powertrain to restrict the power that can be generated by the powertrain to the power limit.

The controller may be configured to cause a notification of the parameter of the powertrain to be provided to an operator of the electric vehicle when the power limit is visually indicated by the power indicator.

The power limit may be a first power limit. The controller may be configured to, when a second power limit on the power that can be generated by the powertrain is active and is more restrictive than the first power limit, cause the power indicator to: cease to visually indicate the first power limit along the scale of the power indicator; and cause the power indicator to visually indicate the second power limit along the scale of the power indicator.

The parameter may be a first parameter. The second power limit may be associated with a second parameter of the powertrain different from the first parameter.

The controller may be configured to cause a notification of the second parameter of the powertrain to be provided to the operator of the electric vehicle when the second power limit is visually indicated by the power indicator.

The second power limit may be associated with an operating mode of the electric vehicle.

The change in the power limit may include a change from a first limit value to a second limit value different from the first limit value. The controller may be configured to: visually indicate the change in the power limit using a visual indication; when the visual indication indicates the first limit value, cause the visual indication to be shown in a first color corresponding to a first alert level; and when the visual indication indicates the second limit value, cause the visual indication to be shown in a second color corresponding to a second alert level. The second color may be different from the first color.

The visual indication may be a first visual indication. The controller may be configured to: cause a second visual indication to be provided to an operator of the electric vehicle when the power limit is visually indicated by the power indicator, the second visual indication being indicative of the parameter of the powertrain; when the first visual indication is shown in the first color, cause the second visual indication to be shown in the first color; and when the first visual indication is shown in the second color, cause the second visual indication to be shown in the second color.

The electric vehicle may comprise a tachometer, wherein the controller is configured to cause the tachometer to visually indicate an operating speed limit of the motor.

The parameter of the powertrain may include a temperature of the battery.

The parameter of the powertrain may include a temperature of the electric motor.

The parameter of the powertrain may include a state of charge of the battery.

Embodiments may include combinations of the above features.

In another aspect, the disclosure describes a method of controlling an electric vehicle. The method comprises:
sensing a parameter of a powertrain of the electric vehicle, the powertrain including an electric motor for propelling the electric vehicle and a battery for powering the electric motor;
when the parameter is indicative of a non-normal condition of the powertrain:
restricting power that can be generated by the powertrain to a power limit selected to mitigate the non-normal condition, the power limit being variable as a function of the non-normal condition; and
dynamically displaying on an instrument panel of the electric vehicle the power limit of the electric vehicle to reflect a variation of the non-normal condition.

Dynamically displaying the power limit may include displaying a gradual movement of a visual indication along a scale of a power indicator.

The method may comprise causing the non-normal condition to be visually communicated to an operator of the electric vehicle.

The power limit may be a first power limit. The method may include: restricting power that can be generated by the powertrain to a second power limit more restrictive than the first power limit; ceasing to display the first power limit on the instrument panel; and displaying the second power limit on the instrument panel.

The non-normal condition may be a first non-normal condition. The second power limit may be selected to mitigate a second non-normal condition of the powertrain.

The second power limit may be associated with an operating mode of the electric vehicle.

The power limit may be indicative of a maximum amount of power that can be output from the powertrain during propulsion of the electric vehicle.

The power limit may be indicative of a maximum amount of power that can be generated by the powertrain during regenerative braking.

The method may comprise displaying an operating speed limit of the motor on a tachometer of the electric vehicle. The operating speed limit may be lower than a maximum operating speed of the motor capable of being indicated by the tachometer.

Embodiments may include combinations of the above features.

In another aspect, the disclosure describes a computer program product for controlling an electric vehicle. The computer program product comprises a non-transitory computer readable storage medium having program code embodied therewith. The program code is readable/executable by a computer, processor or logic circuit to perform a method as disclosed herein.

In another aspect, the disclosure describes a power indicator for visually indicating a real-time amount of power generated by a powertrain of an electric vehicle. The power indicator comprises:
a first visual indication indicating the real-time amount of power generated by the powertrain; and
a second visual indication dynamically indicating a variable power limit on the power that can be generated by the powertrain, the variable power limit being variable as a function of a variable operating parameter of the powertrain.

The power indicator may comprise a visible scale extending between a first scale value and a second scale value. The first indication and the second indication may be movable along the scale.

The second indication may be gradually movable along the scale to reflect a variation of the operating parameter of the powertrain substantially in real-time.

The second visual indication may include a band having a variable length extending along a portion of the scale.

The power indicator may comprise a third visual indication indicating the operating parameter of the powertrain.

The second visual indication and the third visual indication may be of a same color corresponding to an alert level associated with the operating parameter.

The power limit may be indicative of a maximum amount of power that can be output from the powertrain.

The power limit may be indicative of a maximum amount of power that can be generated by the powertrain during regenerative braking.

In another aspect, the disclosure describes an electric powersport vehicle comprising a power indicator as disclosed herein.

Further details of these and other aspects of the subject matter of this application will be apparent from the detailed description included below and the drawings.

DESCRIPTION OF THE DRAWINGS

Reference is now made to the accompanying drawings, in which:

FIGS. 6A, 6B, 7A and 7B illustrate an exemplary power indicator indicating power limits associated with operating parameters of the vehicle of FIG. 1.

DETAILED DESCRIPTION

The present disclosure relates to dynamic power indicators and associated methods for electric vehicles. In some embodiments, the power indicators and methods described herein may be particularly suitable for use with electric off-road (e.g., powersport) vehicles. In some embodiments, the power indicators and methods described herein may assist an operator of the vehicle by promoting enhanced situational awareness in respect of the current capabilities of the vehicle. For example, in the event where a capability of the vehicle is being restricted due to a (e.g., non-normal) operating condition such as a temperature of a motoring battery of the vehicle being outside of a normal operating range, the power indicators and methods described herein may visually indicate the restriction, optionally quantify and/or qualify the restriction, and optionally indicate a reason for the restriction. The power indicators and methods described herein may operate to dynamically visually indicate an operational limit as a function of a varying (e.g., evolving or waning) non-normal condition substantially in real-time.

In some embodiments, the power indicators and methods described herein may promote a safe operation of the electric vehicle by helping the operator of the electric vehicle operate the electric vehicle in a manner that is consistent with the current capabilities of the electric vehicle, and optionally help the operator mitigate a non-normal condition of the electric vehicle.

A non-normal operating condition may occur when a parameter of the electric vehicle is outside of an intended, optimal or otherwise defined range. A defined range for the parameter may be selected to improve vehicle efficiency, improve operator safety and/or improve the longevity of vehicle components (e.g., reduce wear on components and/or reduce the risk of damage to components). Non-limiting examples of such parameters include a temperature of a motor and a temperature of a motoring battery.

The term "connected" may include both direct connection (in which two elements that are connected to each other contact each other) and indirect connection (in which at least one additional element is located between the two elements).

The term "substantially" as used herein may be applied to modify any quantitative representation which could permissibly vary without resulting in a change in the basic function to which it is related.

Aspects of various embodiments are described through reference to the drawings.

Figure 1:
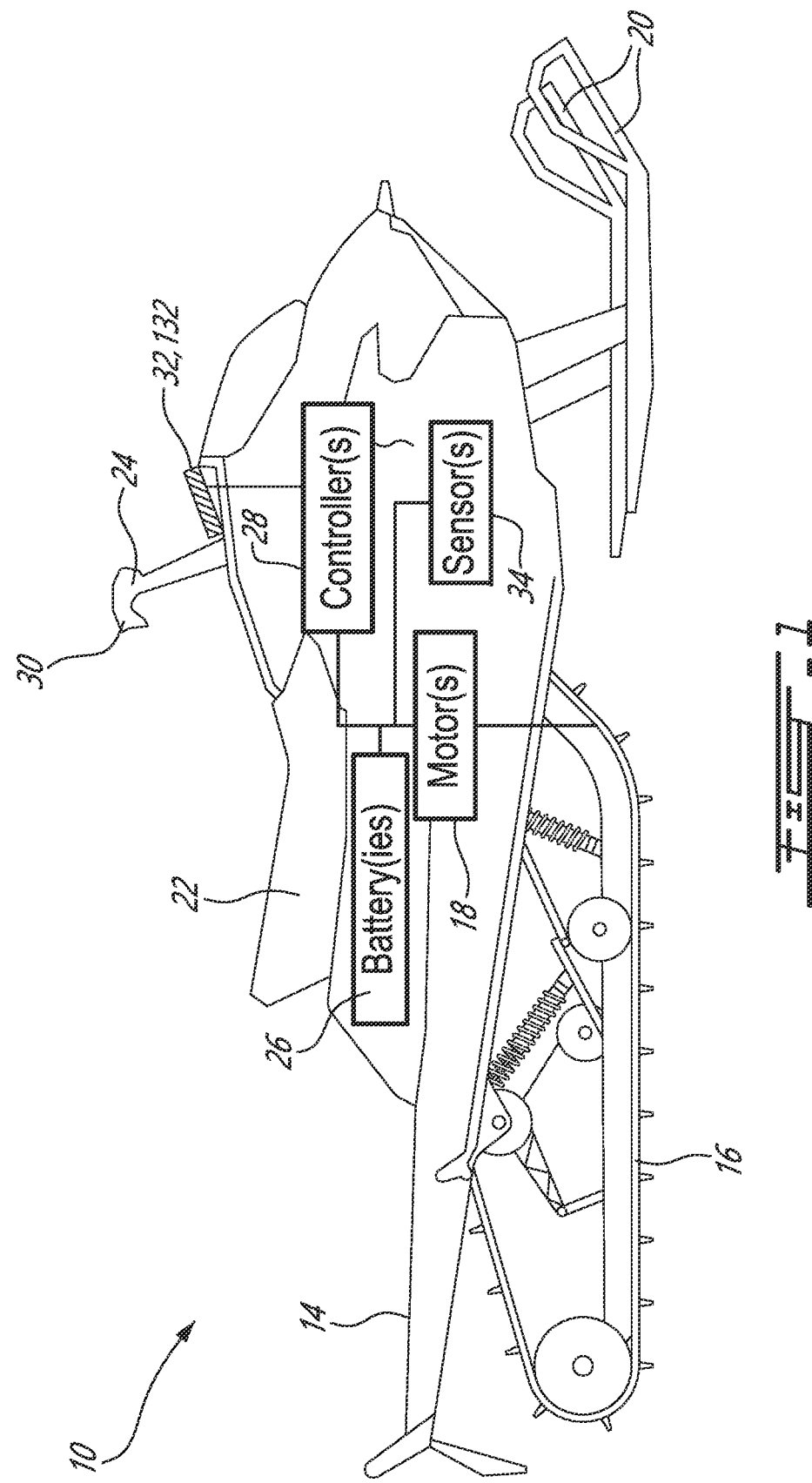
FIG. 1 is a schematic side elevation view of an exemplary electric vehicle including a power indicator as described herein.

FIG. 1 is a schematic side elevation view of an exemplary electric off-road vehicle 10 (referred hereinafter as "vehicle 10"), which may include a power indicator as described herein. As illustrated in FIG. 1, vehicle 10 may be a snowmobile but it is understood that the power indicators and methods described herein may also be used with other types of electric vehicles including utility task vehicles (UTVs), such as side-by-side vehicles, all-terrain vehicles (ATVs), and personal watercraft (PWC) for example. In some embodiments, vehicle 10 may be an electric snowmobile including elements of the snow vehicle described in International Patent Publication no. WO 2019/049109 A1 (Title: Battery arrangement for electric snow vehicles), and U.S. Patent Application No. 63/135,497 (Title: Electric vehicle with battery pack as structural element) which are incorporated herein by reference.

Vehicle 10 may include a frame (also known as a chassis) which may include tunnel 14, track 16 having the form of an endless belt for engaging the ground and disposed under tunnel 14, one or more electric motors 18 (referred hereinafter in as "motor 18") mounted to the frame and configured to drive track 16, left and right skis 20 disposed in a front portion of vehicle 10, straddle seat 22 disposed above tunnel 14 for accommodating an operator of vehicle 10 and optionally one or more passengers. Skis 20 may be movably connected to the frame to permit steering of vehicle 10 via a steering assembly including a steering column interconnecting handlebar 24 with skis 20.

Motor 18 may be drivingly connected to track 16 via a drive shaft to cause propulsion of vehicle 10. Motor 18 may be in torque-transmitting engagement with the drive shaft via a belt/pulley drive. However, motor 18 may be in torque-transmitting engagement with the drive shaft via other arrangements such as a chain/sprocket drive, or shaft/gear drive for example. The drive shaft may be drivingly connected to track 16 via one or more toothed wheels or other means so as to transfer motive power from motor 18 to track 16.

Vehicle 10 may also include one or more (e.g., high-voltage) batteries 26 (referred hereinafter in the singular as "battery 26") for providing electric power to motor 18 and driving motor 18. Battery 26 may be a main battery pack used for propelling vehicle 10, and may be referred to as a motoring battery. Battery 26 may be disposed under seat 22. The operation of motor 18 may be controlled by one or more controllers 28 (referred hereinafter in the singular) based on an actuation of accelerator 30, also referred to as "throttle", by the operator. In some embodiments, battery 26 may be a rechargeable lithium ion or other type of battery. In some embodiments, battery 26 may be configured to output electric power at a voltage of between 300-400 volts, or up to 800 volts, for example.

Vehicle 10 may include instrument panel 32 and/or one or more other display devices for displaying (e.g., status) information about one or more systems of vehicle 10. Instrument panel 32 may include one or more indicators such as needle indicators, gages, dials and digital readouts for displaying information about vehicle 10. Instrument panel 32 may include a liquid crystal display (LCD) screen, thin-film-transistor (TFT) LCD screen, light-emitting diode (LED) or other suitable display device operatively connected to controller 28 and/or to one or more other systems of vehicle 10. In some embodiments, instrument panel 32 may include a display device, which may be touch-sensitive to facilitate operator inputs. As explained below, instrument panel 32 may include a speedometer indicating a current speed of vehicle, a tachometer indicating a current operating speed of motor 18 in revolutions-per-minute (RPM), a power indicator indicating an amount of power being generated by a powertrain of vehicle 10 (including output power used to drive track 16 and regenerative input power used to charge battery 26), a battery state of charge (SoC) indicator associated with battery 26, and/or other analog or digital readouts. Vehicle 10 may include one or more sensors 34 for sensing one or more operating parameters of vehicle 10.

Figure 2:
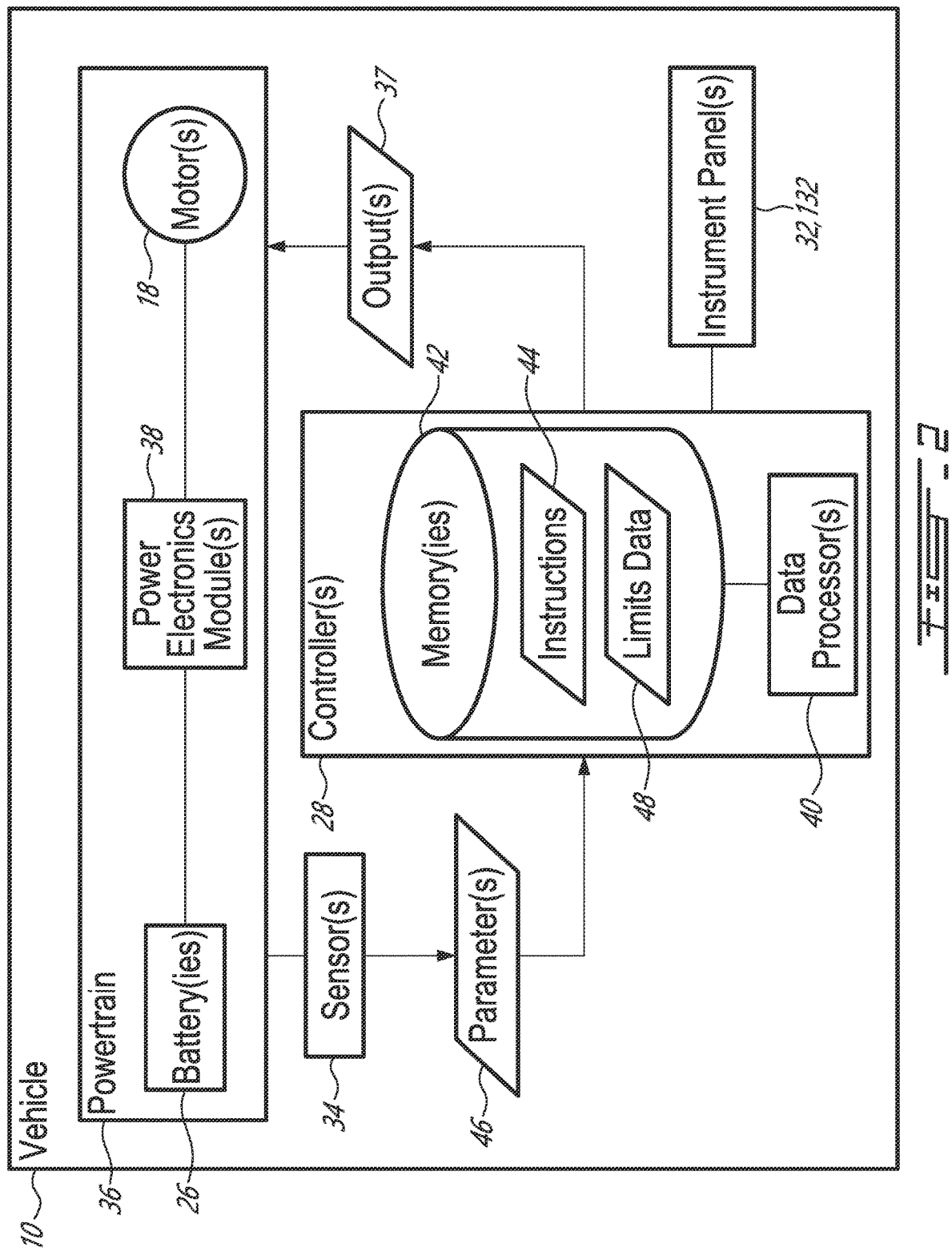
FIG. 2 is another schematic illustration of the vehicle of FIG. 1.

FIG. 2 is another exemplary schematic representation of vehicle 10. Motor 18 may provide propulsive power to vehicle 10 and may be part of powertrain 36 of vehicle 10. In various embodiments, motor 18 may be a permanent magnet synchronous motor or a brushless direct current motor for example. Motor 18 may have a maximum power output of between 90 and 135 kW, or motor 18 may have a maximum output power of greater than 135 kW, for example. Motor 18 may be of a same type as, or may include elements of, the motors described in U.S. Provisional Patent Application No. 63/135,466 (Title: Drive unit for electric vehicle) and U.S. 63/135,474 (Title: Drive unit with fluid pathways for electric vehicle), which are incorporated herein by reference.

Motor 18 may be drivingly connected to track 16 (shown in FIG. 1) in embodiments where vehicle 10 is a snowmobile for example. For UTVs and ATVs, motor 18 may be drivingly connected to ground-engaging wheels. For PWCs, motor 18 may be drivingly connected to an impeller for example. Powertrain 36 may also include battery 26 for providing electric power to motor 18. The operation of motor 18 and the delivery of electric power to motor 18 may be controlled by controller 28 via output(s) 37 and power electronics module 38 (referred hereinafter as "PEM 38"). PEM 38 may include suitable electronic switches (e.g., insulated gate bipolar transistor(s)) to provide motor 18 with electric power having the desired voltage, current, waveform, etc. to implement the desired performance of vehicle 10 based on an actuation of accelerator 30 by the operator to indicate a command to propel vehicle 10A. In some embodiments, PEM 38 may include a motor controller and/or power inverter for example.

One or more of sensors 34 may be operatively connected to component(s) of powertrain 36 and configured to sense one or more parameters of powertrain 36. Controller 28, via the control of PEM 38 and using feedback from sensor(s) 34, may control the amount of motive power that may be output from powertrain 36 during propulsion of vehicle 10, and also control the amount of electric power that may be delivered to battery 26 during regenerative braking. Controller 28 may include one or more data processors 40 (referred hereinafter as "processor 40") and non-transitory machine-readable memory 42. Controller 28 may be operatively connected to sensor(s) 34 via wired or wireless connections for example so that one or more parameters acquired via sensor(s) 34 may be received at controller 28 and used by processor 40 in one or more procedures or steps defined by machine-readable instructions 44 stored in memory 42 and executable by processor 40.

Controller 28 may carry out additional functions than those described herein. Processor 40 may include any suitable device(s) configured to cause a series of steps to be performed by controller 28 so as to implement a computer-implemented process such that instructions 44, when executed by controller 28 or other programmable apparatus, may cause the functions/acts to be executed. Processor 40 may include, for example, any type of general-purpose microprocessor or microcontroller, a digital signal processing (DSP) processor, an integrated circuit, a field programmable gate array (FPGA), a reconfigurable processor, other suitably programmed or programmable logic circuits, or any combination thereof.

Memory 42 may include any suitable machine-readable storage medium. Memory 42 may include non-transitory computer readable storage medium such as, for example, but not limited to, an electronic, magnetic, optical, electromagnetic, infrared, or semiconductor system, apparatus, or device, or any suitable combination of the foregoing. Memory 42 may include a suitable combination of any type of machine-readable memory that is located either internally or externally to controller 28. Memory 42 may include any storage means (e.g. devices) suitable for retrievably storing machine-readable instructions executable by processor 40.

Sensor(s) 34 may include one or more current sensors and/or one or more voltage sensors operatively connected to battery 26 and/or operatively connected to PEM 38. Sensor(s) 34 may include a position sensor (e.g., encoder) operatively coupled to motor 18 to measure a position and/or rotational speed of a rotor of motor 18. Sensor(s) 34 may include a speed sensor (e.g., revolution counter) operatively coupled to motor 18 to measure the rotational speed of motor 18. Sensor(s) 34 may include a torque sensor operatively coupled to motor 18 to measure an output torque of motor 18. Alternatively, the output torque of motor 18 may be inferred by controller 28 based on an amount of electric current being delivered to motor 18. Sensor(s) 34 may include one or more temperature sensors such as one or more thermocouples or resistance temperature detectors (RTD) suitable for measuring a temperature of one or more cells of battery 26, for measuring a temperature of a component of PEM 38, and/or for measuring a temperature of a component of motor 18 for example. Sensor(s) 34 may acquire one or more signals indicative of, or useful in inferring, one or more operating parameters 46 of powertrain 36. For example, sensor(s) 34 may acquire one or more signals indicative of, or useful in inferring, an amount of electric power being discharged from battery 26 during propulsion of vehicle 10, an amount of electric power being received into battery 26 to charge battery 26 during regenerative braking of vehicle 10, an amount of motive power being generated by motor 18 during propulsion of vehicle 10, and/or an amount of electric power being generated by motor 18 when motor 18 is operating as a generator during regenerative braking of vehicle 10. Sensor(s) 34 may acquire one or more signals indicative of, or useful in inferring, a state of charge (SoC) of battery 26 and/or other parameters of powertrain 36. For example, sensor(s) 34 may implement coulomb counting using a current sensor to infer the SoC of battery 26. The SoC may be expressed as a percentage of the capacity of battery 26 (e.g., 0%=empty; 100%=full), or as any other suitable indication.

Instrument panel 32 may be operatively connected (e.g., in electronic communication, wired) to controller 28 so that controller 28 may control some aspects of operation of instrument panel 32 based on instructions 44. For example, based on one or more sensed parameters 46 of powertrain 36, controller 28 may determine, based on limits data 48, whether or not the operation of vehicle 10 needs to be restricted to mitigate a non-normal operating condition or for another reason. Controller 28 may be configured to restrict operation of vehicle 10 based on limits data 48 and also cause instrument panel 32 to visually display one or more applied limits.

Figure 3:
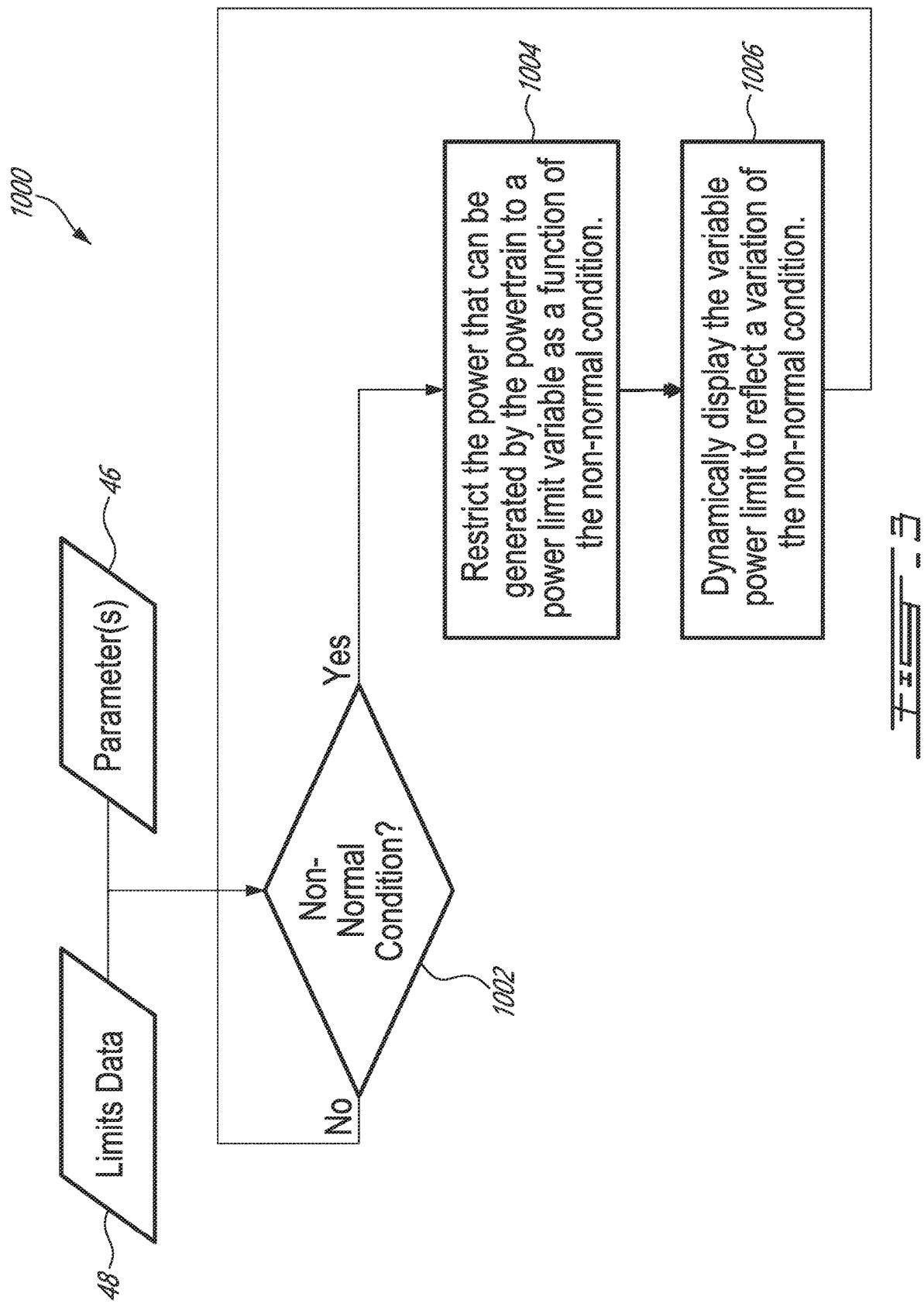
FIG. 3 is a flow diagram of a method of controlling an electric vehicle.

FIG. 3 is a flow diagram of a method 1000 of controlling an electric vehicle such as vehicle 10. Method 1000 may include other actions, or may be combined with other methods or actions disclosed. Method 1000 may be carried out using elements of vehicle 10. Functions and other aspects of vehicle 10 may be incorporated into method 1000. Method 100 may be computer-implemented. In various embodiments, method 100 may include:

sensing parameter 46 of powertrain 36 of vehicle 10, the powertrain including motor 18 for propelling vehicle 10 and battery 26 for powering motor 18;

when parameter 46 is indicative of a non-normal condition of powertrain 36 at decision block 1002 (e.g., using limits data 48), method 1000 may include:

restricting the power that can be generated by powertrain 36 to a power limit (block 1004), the power limit being variable as a function of the non-normal condition; and dynamically displaying (e.g., on instrument panel 32) the power limit to reflect a variation of the non-normal condition (block 1006).

In some embodiments, the power limit may be selected to mitigate the non-normal condition. For example, the power limit may be selected to promote mitigation of the non-normal condition when the operation of vehicle 10 is restricted to the selected power limit.

The dynamic display of the power limit may display a variation of the power limit to reflect the variation of the non-normal condition substantially in real-time. For example, the display of the power limit may be substantially synchronized with one or more parameters 46 that are indicative of evolving or waning of the non-normal condition. Various aspects of method 1000 are described below in reference to other figures.

Figure 4:
FIG. 4 is a data table defining power limits associated with operating parameters of the vehicle of FIG. 1.

FIG. 4 is a data table defining power limits associated with operating conditions of powertrain 36. The table of FIG. 4 may be stored in memory 42 of controller 28 and is identified as limits data 48 in FIGS. 2 and 4. Limits data 48 may be used in method 1000 by controller 28 to restrict one or more aspects of operation of vehicle 10 based on one or more parameters 46 of powertrain 36 sensed via sensor(s) 34 for example. Limits data 48 may be formatted as a lookup table that maps power limits to different operating conditions of powertrain 36 determined from sensed parameters 46 of powertrain 36.

In some embodiments of vehicle 10, other power limits not represented in FIG. 4 and not associated with non-normal conditions may be applied by controller 28. Such other power limits may be based on an operating mode (e.g., economy, normal, sport) of vehicle 10 selected by an operator of vehicle 10 for example. In some situations, such other power limits may be more restrictive than and may override the power limits associated with non-normal conditions. In some embodiments, vehicle 10 may be equipped with factory-defined operating modes such as economy (e.g., "range"), normal and sport modes, which may define different performance characteristics of vehicle 10. Such operating modes may correspond to performance and/or operator skill levels such as novice, intermediate and expert respectively, and may come with factory-defined sets of operating parameters for vehicle 10. For example, an "eco" or economy operating mode may be intended to assist the operator in driving in a way that promotes an extended battery range. A sport operating mode may be intended to provide increased acceleration responsiveness. A normal mode may facilitate a vehicle performance between the economy and sport modes.

In reference to FIG. 4, examples of powertrain parameters 46 that may be used to apply power limits may include a temperature of battery 26 and a temperature of motor 18. For example, the temperature of battery 26 may affect the ability of battery 26 to deliver electric power to motor 18 during propulsion of vehicle 10, and/or may affect the ability of battery 26 to receive electric power from motor 18 when motor 18 is operating as a generator during regenerative braking. The temperature of motor 18 may also be used to apply a power limit on the motive power that can be generated by motor 18 when motor 18 is propelling vehicle 10, and/or apply a power limit on the electric power that can be generated by motor 18 when motor 18 is operating as a generator during regenerative braking. The temperature of motor 18 may include a temperature of PEM 38.

FIG. 4 shows threshold values for sensed parameters 46 of powertrain 36 associated with normal and non-normal operating conditions of powertrain 36. A battery temperature of between BT1 and BT2 may represent normal operating conditions where no power limits may be applied and powertrain 36 may be operable within its full operating range. A battery temperature below BT1 may be too cold for battery 26 to deliver or receive power at its full capacity. For example, at battery temperatures below BT1, power input limit L1A may be applied to limit an amount of power that can be delivered to battery 26 during regenerative braking of vehicle 10. At battery temperatures below BT1, power output limit L1B may be applied to limit an amount of power that can be delivered from battery 26. At battery temperatures between BT2 and BT3, battery 26 may be considered hot and power input limit L2A may be applied to limit an amount of power that can be delivered to battery 26 during regenerative braking of vehicle 10. At battery temperatures between BT2 and BT3, power output limit L2B may be applied to limit an amount of power that can be delivered from battery 26. At battery temperatures greater than BT3, battery 26 may be considered very hot and power input limit L3A may be applied to limit an amount of power that can be delivered to battery 26 during regenerative braking of vehicle 10. At battery temperatures greater than BT3, power output limit L3B may be applied to limit an amount of power that can be delivered from battery 26.

A motor temperature below MT1 may represent normal operating conditions where no power limits may be applied and powertrain 36 may be operable within its full operating range. A motor temperature between MT1 and MT2, motor 18 may be considered hot and power input limit L4A may be applied to limit an amount of power that can be generated by motor 18 during regenerative braking of vehicle 10. At motor temperatures between MT1 and MT2, power output limit L4B may be applied to limit an amount of power that can be generated by motor 18 during propulsion of vehicle 10. At motor temperatures greater than MT2, motor 18 may be considered very hot and power input limit L5A may be applied to limit an amount of power that can be generated by motor 18 during regenerative braking of vehicle 10. At motor temperatures greater than MT2, power output limit L5B may be applied to limit an amount of power that can be generated by motor 18 during propulsion of vehicle 10.

Other parameters 46 of powertrain 36 may also be used to apply power limits. For example, a high SoC of battery 26 may limit the ability of battery 26 to accept a charge and a suitable power input limit may be applied to limit an amount of power that can be generated by motor 18 and delivered to battery 26 during regenerative braking of vehicle 10. A low SoC of battery 26 might limit the ability of battery 26 to provide a high-power output and a suitable power limit may be applied to limit an amount of power that can be drawn from battery 26.

In some embodiments, the power limits may be selected and applied by controller 28 to prevent damage to powertrain 36 and/or promote a safe operation of vehicle 10. In some embodiments, the power limits may be selected and applied by controller 28 to mitigate a non-normal condition. For example, during a cold battery condition, the power input/output to/from battery 26 may be limited to permit a gradual and safe warming of battery 26 toward the normal operating temperature following the start-up of vehicle 10. For example, during a hot or very hot battery condition, the power input/output to/from battery 26 may be limited to prevent overheating of battery 26 and/or to permit cooling of battery 26 toward the normal operating temperature of battery 26. For example, during a hot or very hot motor condition, the operation of motor 18 may be limited to prevent overheating of motor 18 and/or to permit cooling of motor 18 toward the normal operating temperature of motor 18. In some embodiments, extended operation of battery 26 at very hot temperatures may result in degradation of battery 26 (e.g., a loss of battery capacity). In some embodiments, operation of motor at hot temperatures may result in reduced motor efficiency (e.g., due to increased resistance of electrical wires used in motor 18), and extended operation of motor 18 at very hot temperatures may result in damage to motor 18.

During operation of vehicle 10, it may be possible for more than one power limit to be applicable at the same time due to more than one non-normal conditions existing concurrently, and/or due to a non-normal condition coexisting with a restrictive operating mode of vehicle 10 for example. In situations where a plurality of power limits are concurrently applicable, controller 28 may apply the most restrictive power limit as explained below in reference to FIGS. 7A and 7B.

In some embodiments, different non-normal conditions may be associated with different alert levels depending on the criticality (i.e., severity) of the non-normal condition. For example, a hot battery condition, a cold battery condition, and a hot motor condition may be associated with a first alert level identified as "CAUTION" in FIG. 4. On the other hand, a very hot battery condition and a very hot motor condition may be associated with a second alert level higher than the first alert level. The second alert level is identified as "WARNING" in FIG. 4.

Figure 5:
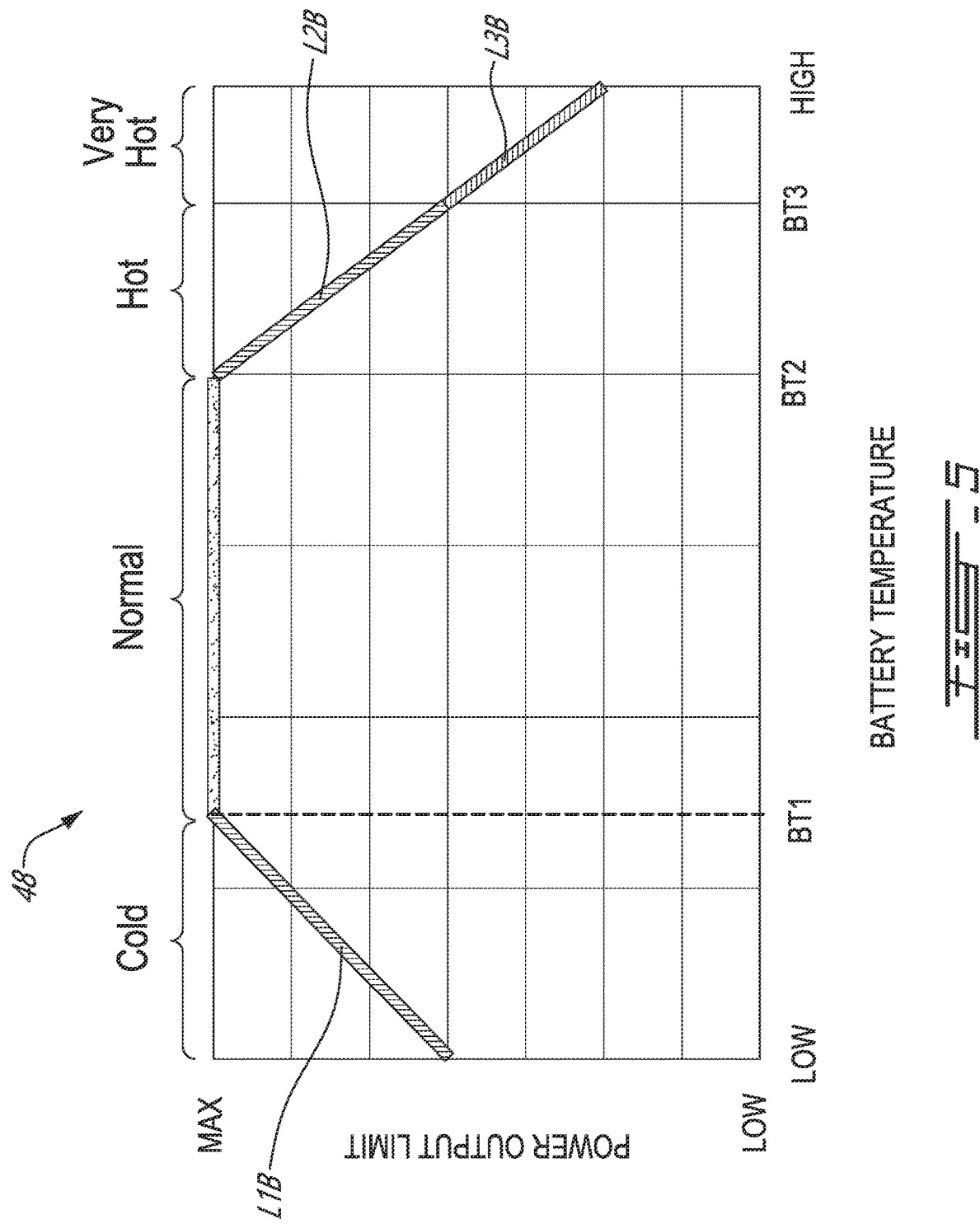
FIG. 5 is a plot graphically illustrating a power output limit variable as a function of a battery temperature of the vehicle of FIG. 1.

FIG. 5 is a plot graphically illustrating a power output limit that is variable as a function of a temperature of battery 26. A similar plot may be provided to graphically represent a power input limit that is variable as a function of a temperature of battery 26. A variable power input limit, and a variable power output limit as a function of motor temperature may similarly be represented in a graphical manner.

As shown in FIG. 5, the power output limit may vary as a function of the evolution or waning of the non-normal condition. FIG. 5 shows a linear relationship between the power output limit (e.g., lines L1B, L2B, L3B) and battery temperature but it is understood that non-linear relationships may be suitable. In some embodiments, the slope of line L3B may be steeper than the slope of line L2B to reduce power output at very hot temperatures and help cool battery 18 more rapidly. The lines representing power output limits L1B and L2B are shown with vertical hatching representing the CAUTION alert level. The lines representing power output limit L3B is shown in horizontal hatching to represent the higher WARNING alert level.

FIGS. 6A, 6B, 7A and 7B illustrate an exemplary power indicator 50 visually indicating power output limits associated with operating conditions of powertrain 36. In reference to FIG. 6A, power indicator 50 may be displayed on instrument panel 32 or elsewhere on vehicle 10. Power indicator 50 may include rotatable needle 52 visually indicating a current amount of power generated by powertrain 36 substantially in real-time. Needle 52 may substantially instantaneously indicate a power value along scale 54 that is generated by powertrain 36 and may move in response to the application of accelerator 30. For example, the current amount of power generated may be determined using current and/or voltage measurements of electric power being delivered from battery 26 to motor 18.

Power indicator 50 may visually indicate the amount of power generated by powertrain 36 along scale 54 extending between a first scale value (e.g., 0 kW) and a second scale value (e.g., 100 kW) larger than the first scale value. Scale 54 may be arc-shaped but could instead be straight and oriented vertically or horizontally. Controller 28 may be operatively connected to power indicator 50 to control the operation of power indicator 50.

Figure 6A:
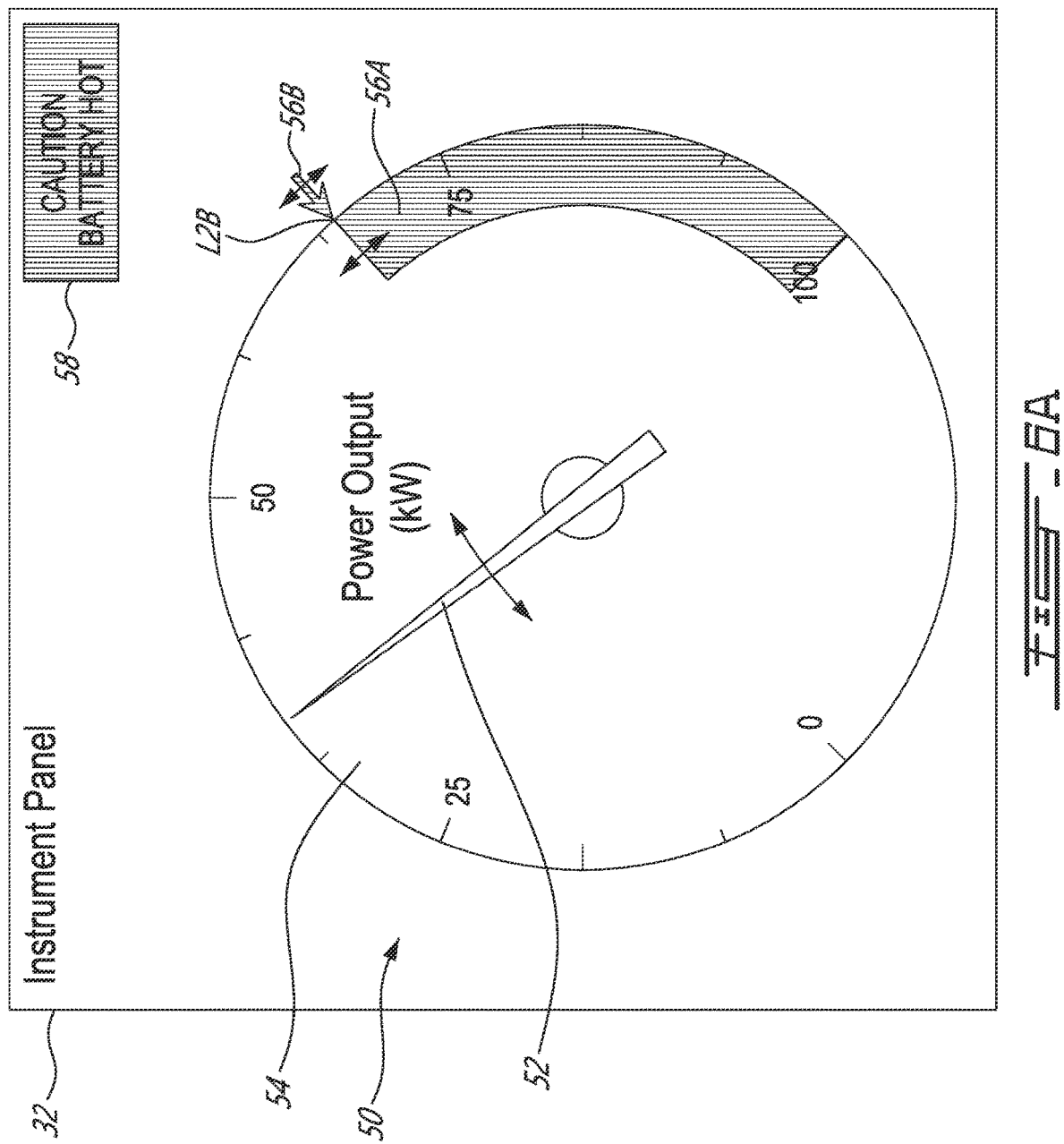

In reference to FIG. 6A, power indicator 50 may visually indicate power output limit L2B on the power that can be generated by powertrain 36 along scale 54. Power output limit L2B may be located between the first scale value and the second scale value. The first and second scale values may represent a range of power output levels that are available during unrestricted operating conditions of vehicle 10. In other words, power output limit L2B may be lower than a maximum output power capable of being indicated by power indicator 50. Power output limit L2B may be associated with a value of a parameter 46 of powertrain 36 such as the temperature of battery 26 for example. Power output limit L2B may be indicated on power indicator 50 by way of one or more visual limit indications 56A, 56B disposed along scale 54. Limit indications 56A, 56B may be movable along scale 54 as indicated by the double-ended arrows. The position of limit indications 56A, 56B along scale 54 may be continuously variable as a function of the applicable parameter 46 to indicate the corresponding value of power output limit L2B. In other words, a change in position of limit indications 56A, 56B along scale 54 may reflect a change in the value of the battery temperature. In some embodiments, the position of limit indications 56A, 56B may be substantially synchronized with the value of the battery temperature so that the dynamic positioning of limit indications 56A, 56B may indicate the evolution or waning of the non-normal condition substantially in real-time. In some embodiments, changes in position of limit indications 56A, 56B along scale 54 may be displayed as a gradual (e.g., smooth, continuous) movement along scale 54 to visually indicate the variation of the non-normal condition.

First limit indication 56A may include a band having a variable length extending along a portion of scale 54 that is unavailable due to the application of power output limit L2B. The length of first limit indication 56A may be dynamically variable to dynamically indicate power output limit L2B that is variable as a function of the battery temperature. Changes in position of first limit indication 56A along scale 54 may be displayed as a gradual (e.g., smooth, continuous) change in the length of the band. In other words, the gradual change in the length of the band may exclude discrete changes (e.g., steps or jumps) in length. The band may superimpose scale 54 or may be disposed beside scale 54.

Alternatively or in addition to first limit indication 56A, second limit indication 56B may be provided. Second limit indication 56B may include an arrow or other suitable marker that is movable along scale 54 to visually indicate power output limit L2B that is variable as a function of the battery temperature. Changes in position of second limit indication 56B along scale 54 may be displayed as a gradual (e.g., smooth, continuous) displacement of second limit indication 56B along scale 54. In other words, the gradual change in position of second limit indication 56B may exclude discrete changes (e.g., steps or jumps) in position.

The use of first visual indication 56A and/or second limit indication 56B may provide an at-a-glance visual indication that power output limit L2B is being applied, an at-a-glance visual indication of the magnitude of the restriction that is associated with power output limit L2B, and also provide an at-a-glance visual indication of the variation of the non-normal condition. In some embodiments, limit indication(s) 56A, 56B may contribute to the overall awareness of the operator with respect to the capabilities of vehicle 10 and permit the operator to operate vehicle 10 accordingly.

In some embodiments, controller 28 may be configured to cause visual condition indication 58 to be provided to an operator of vehicle 10 when power output limit L2B is applied and visually indicated on power indicator 50. Condition indication 58 may identify the non-normal condition that is causing power output limit L2B to be applied, may identify parameter 46 that is causing power output limit L2B to be applied, and/or may display a value of parameter 46 that is causing power output limit L2B to be applied. The value of parameter 46 may be a numerical (e.g., temperature) value or may be a relative value such as "cold", "hot", "very hot", "low", "medium" and "high" for example. Condition indication 58 may communicate to the operator of vehicle 10 a reason why power output limit L2B is being applied.

Limit indication(s) 56A, 56B may be shown in a color corresponding to an alert level associated with power output limit L2B to provide an at-a-glance visual indication of the criticality of the non-normal condition associated with power output limit L2B. In some embodiments, condition indication 58 may be shown in the same color as that of limit indication(s) 56A, 56B for consistency in communicating the criticality of the non-normal condition to the operator. In the example shown in FIG. 6A, the color of limit indications 56A, 56B and of condition indication 58 may be amber (shown using vertical hatching) to represent a "CAUTION" alert level corresponding to the "BATTERY HOT" condition defined by limits data 48 shown in FIG. 4.

FIG. 6B shows power indicator 50 visually indicating power output limit L3B on the power that can be generated by powertrain 36 along scale 54. Power output limit L3B may be associated with a value of a parameter 46 of powertrain 36 such as the temperature of battery 26 for example. Power output limit L3B may be indicated on power indicator 50 by way of one or more visual limit indications 56A, 56B disposed along scale 54. Visual condition indication 58 may be provided to an operator of vehicle 10 when power output limit L3B is active and visually indicated on power indicator 50. The situation represented in FIG. 6B corresponds to a "BATTERY VERY HOT" condition, which has a higher alert level compared to the "BATTERY HOT" condition depicted in FIG. 6A. The color of limit indications 56A, 56B and of condition indication 58 may be red (shown using horizontal hatching) to represent a "WARNING" alert level corresponding to the "BATTERY VERY HOT" condition defined by limits data 48 shown in FIG. 4.

The situation represented in FIG. 6B may be subsequent to the situation represented in FIG. 6A where the non-normal condition associated with the battery temperature has evolved to cause the more restrictive power output limit L3B to be applied, cause the band of first limit indication 56A to be extended, cause the position of second limit indication 56B to be adjusted, and cause the color of limit indication(s) 56A, 56B and of condition indication 58 to be changed according to the higher alert level. Alternatively, the situation represented in FIG. 6B may be prior to the situation represented in FIG. 6A where the non-normal condition associated with the battery temperature has waned to cause the less restrictive power output limit L2B to be applied, cause the band of first limit indication 56A to be shortened, cause the position of second limit indication 56B to be adjusted, and cause the color of limit indication(s) 56A, 56B and of condition indication 58 to be changed according to the lower alert level. The band of first limit indication 56A and the position of second limit indication 56B may move smoothly and continuously between the situations represented in FIGS. 6A and 6B.

Figure 7A:
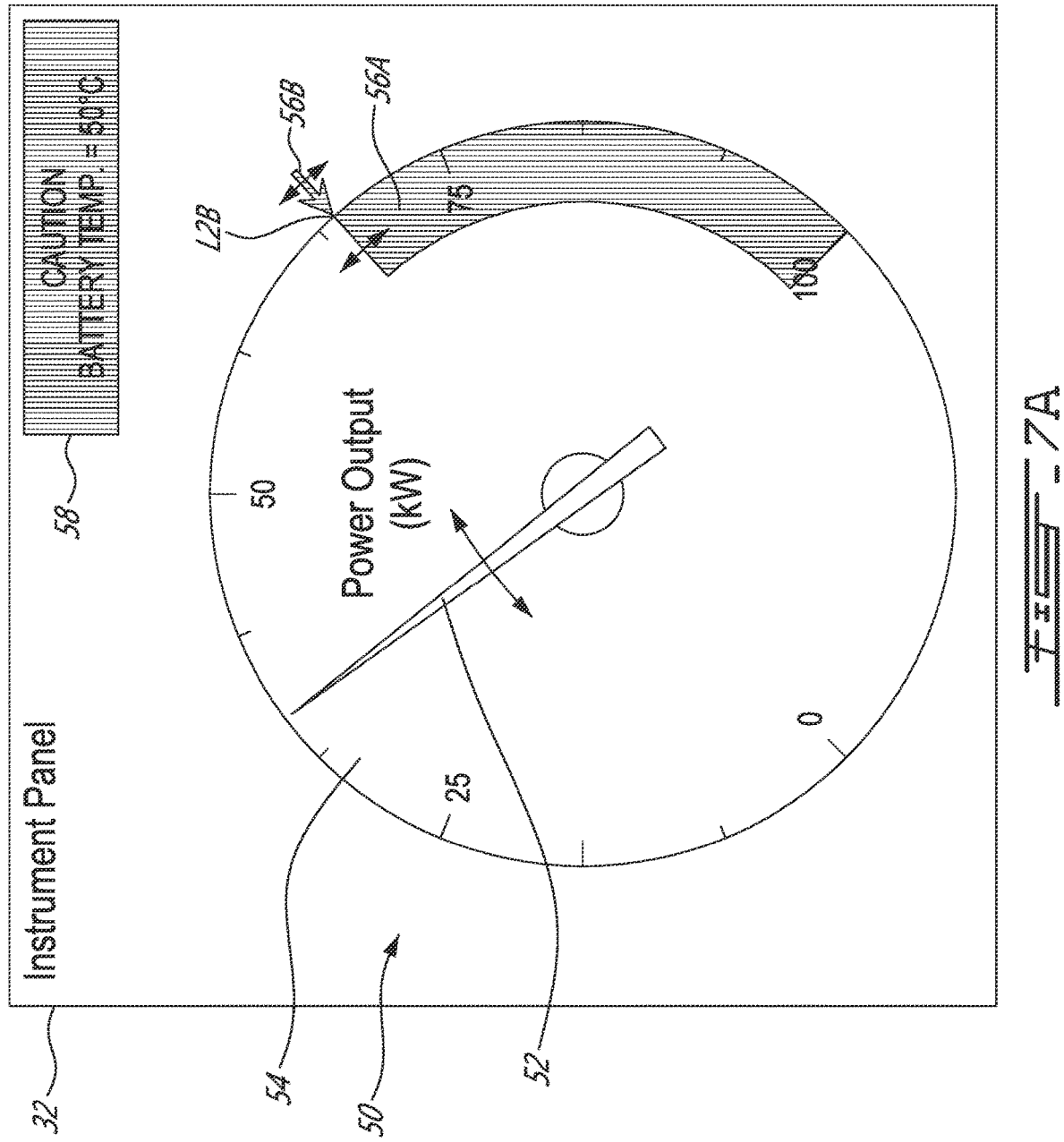

FIG. 7A shows power indicator 50 visually indicating power output limit L2B on the power that can be generated by powertrain 36 along scale 54. Power output limit L2B may correspond to a "BATTERY HOT" condition where the battery temperature is displayed as being 50° C. by condition indication 58. Limit indication(s) 56A, 56B may be disposed along scale 54 and be dynamically movable along scale 54 as a function of the battery temperature. For example, the length of the band of first limit indication 56A may be dynamically increased with an increasing battery temperature to represent an increasingly more restrictive power output limit L2B being applied. Alternatively, the length of the band of first limit indication 56A may be dynamically reduced with a decreasing battery temperature to represent a less restrictive power output limit L2B being applied.

The situation represented in FIG. 7B corresponds to a "MOTOR VERY HOT" condition where the motor temperature is displayed as being 65° C. by condition indication 58, and which has a higher alert level compared to the "BATTERY HOT" condition depicted in FIG. 7A. In the example shown in FIG. 7B, the color of limit indication(s) 56A, 56B and of condition indication 58 may be red to represent a "WARNING" alert level corresponding to the "MOTOR VERY HOT" condition defined by limits data 48 shown in FIG. 4.

The situation represented in FIG. 7B may be subsequent to the situation represented in FIG. 7A where both non-normal conditions of FIGS. 7A and 7B coexist but power output limit L5B of FIG. 7B is more restrictive than power output limit L2B of FIG. 7A. In such situation, controller 28 may cause power indicator 50 to cease to visually indicate power output limit L2B, and cause power indicator 50 to visually indicate the more restrictive power output limit L5B that is being applied instead. In some embodiments, the coexisting non-normal conditions may be associated with different parameters 46 (e.g., battery temperature and motor temperature).

Coexisting power limits may not necessarily be associated with non-normal operating conditions. As explained above, some power limits may be applied based on an operating mode of vehicle 10 selected by the operator, or based on a SoC of battery 26. In some embodiments, controller 28 and power indicator 50 may be configured to only display the most restrictive power limit irrespective of the reason for the limit being applied. Alternatively, controller 28 and power indicator 50 may be configured to display a plurality of power limits concurrently.

Figure 8:
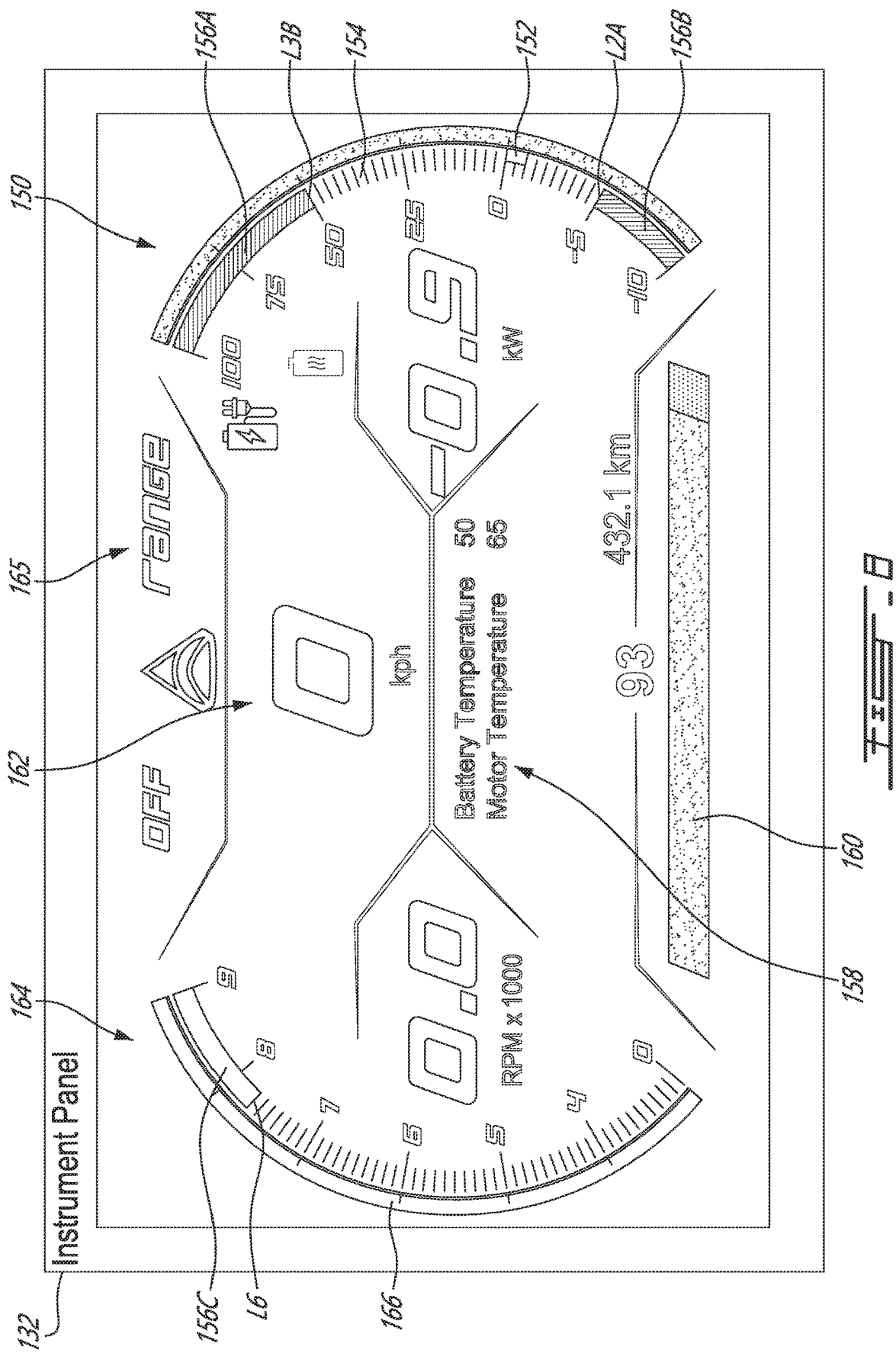
FIG. 8 illustrates another exemplary power indicator indicating power limits associated with operating parameters of the vehicle of FIG. 1.

FIG. 8 illustrates another exemplary power indicator 150 indicating different power limits L3B and L2A associated with different operating conditions of powertrain 36. Power indicator 150 may be part of instrument panel 132 of vehicle 10. Power output limit L3B may be indicative of a maximum amount of power that can be output from powertrain 36 during propulsion of vehicle 10. Power input limit L2A may be indicative of a maximum amount of power that can be generated by powertrain 36 during regenerative braking. Power output limit L3B may be visually indicated by first limit indication 156A, which may include a band extending along scale 154 and having a length that is dynamically variable as a function of the non-normal operating condition in the same manner as first limit indication 56A of power indicator 50. Power output limit L3B may be associated with a motor temperature of 65° C. as shown by condition indication 158 for example. First limit indication 156A may be displayed in the same color as the associated text "Motor Temperature 65" according to the "WARNING" alert level.

Scale 154 may include negative power values to indicate power generated by powertrain 36 during regenerative braking of vehicle 10. Power input limit L2A may be visually indicated by second limit indication 156B, which may include a band extending along scale 154 and having a length that is dynamically variable as a function of the non-normal operating condition in the same manner as first limit indication 56A of power indicator 50. Power input limit L2A may be associated with a battery temperature of 50° C. as shown by condition indication 158 for example. Second limit indication 156B may be displayed in the same color as the associated text "Battery Temperature 50" according to the "CAUTION" alert level.

Instead of a rotatable needle, power indicator 150 may include power indication band 152 that may indicate a current amount of power being generated by powertrain 36. Power indication band 152 may substantially instantaneously indicate a (e.g., input or output) power value along scale 54 that is generated by powertrain 36 and may move in response to the application of accelerator 30. Power indication band 152 may be variably extendable from the zero (0) mark along scale 154. Power indication band 152 may extend in the positive direction along scale 154 to indicate power generated by powertrain 36 during propulsion of vehicle 10. Power indication band 152 may extend in the negative direction along scale 154 to indicate power generated by powertrain 36 during regenerative braking. In reference to FIG. 8, power indication band 152 indicates a value of −0.9 kW of power being generated by powertrain 36 during regenerative braking.

Power output limits and power input limits, and respective limit indications may be associated with other parameters 46 of vehicle 10. For example, a low SoC of battery 26 might limit the ability of battery 26 to provide a high-power output and a suitable power limit may be applied to limit an amount of power that can be drawn from battery 26. Such power output limit may be visually indicated on power indicator 150 in the same way as power output limit L3B is visually indicated by first limit indication 156A. For example, a high SoC of battery 26 may limit the ability of battery 26 to accept a charge and a suitable power input limit may be applied to limit an amount of power that can be generated by motor 18 and delivered to battery 26 during regenerative braking of vehicle 10. Such power input limit may be visually indicated on power indicator 150 in the same way as power input limit L2A is visually indicated by second limit indication 156B.

Instrument panel 132 may include additional components such as battery SoC indicator 160 indicating the current SoC of battery 26 in a graphical or textual representation, speedometer 162 indicating a current speed of vehicle 10, tachometer 164 indicating an operating rotational speed of motor 18, and operating mode indicator 165 shown as indicating a "range" (e.g., economy) operating mode of vehicle 10. In various embodiments, operational limits of vehicle 10 may be displayed on power indicator 150, on speedometer 162, and/or on tachometer 164. For example, third limit indication 156C may be provided on tachometer 164 to indicate operational limit L6 (e.g., maximum operating rotational speed of motor 18) that is associated with a selected operating (e.g., economy) mode selected by the operator of vehicle 10. Operational limit L6 may be lower than a maximum operating speed of motor 18 capable of being indicated by tachometer 164.

Third limit indication 156C may include a band extending along scale 166 of tachometer 164 and having a length that may be variable as a function of operational limit L6 in the same manner as first limit indication 56A of power indicator 50 if operational limit L6 is variable. Since operational limit L6 is not associated with a non-normal condition in the situation depicted in FIG. 8, third limit indication 156C may be displayed in a color that corresponds with a lower (e.g., "ADVISORY") alert level such as cyan for example. However, in some embodiments, operational limit L6 may be associated with a non-normal condition and/or with another power limit. For example, operational limit L6 displayed by tachometer 164 could correspond to power output limit L3B, and first limit indication 156A and third limit indication 156C could be displayed in the same color corresponding to the same alert level.

In some embodiments, the operating mode of vehicle 10 may have an associated operational power limit for vehicle 10. This operational power limit may be represented on power indicator 150 when no non-normal conditions impose more restrictive power limits. For example, if first limit indication 156A gradually reduces in length as motor temperature decreases, then first limit indication 156A may be replaced with an operational limit indication associated with the operating mode of vehicle 10. The operational limit indication associated with the operating mode of vehicle 10 may be set to a fixed power level in some cases.

The above description is meant to be exemplary only, and one skilled in the relevant arts will recognize that changes may be made to the embodiments described without departing from the scope of the invention disclosed.

What is claimed is:

1. An electric vehicle comprising:
    a powertrain including an electric motor for propelling the electric vehicle and a battery for powering the electric motor;
    a power indicator to visually indicate:
        a scale extending between a first scale value and a second scale value, the second scale value being larger than the first scale value; and
        an amount of power generated by the powertrain along the scale extending between the first scale value and the second scale value;
    a sensor operatively connected to the powertrain to sense a parameter of the powertrain; and
    a controller operatively connected to the sensor and to the power indicator, the controller being configured to:
        cause the power indicator to provide a first visual indication of a power limit on the power that can be generated by the powertrain along the scale of the power indicator, the power limit being between the first scale value and the second scale value, an application of the power limit being caused by a value of the parameter of the powertrain;
        cause the power indicator to visually indicate a change in the power limit along the scale to reflect a change in the value of the parameter of the powertrain; and
        cause the power indicator to provide a second visual indication alerting an operator of the electric vehicle of the parameter of the powertrain causing the power limit to be applied.

2. The electric vehicle as defined in claim 1, wherein causing the power indicator to visually indicate the change in the power limit includes causing the power indicator to display a gradual movement of the power limit along the scale as a function of the parameter.

3. The electric vehicle as defined in claim 2, wherein:
    the first visual indication includes a band having a length extending along a portion of the scale; and
    the gradual movement of the first visual indication includes a gradual change in the length of the band.

4. The electric vehicle as defined in claim 2, wherein the gradual movement of the first visual indication is substantially synchronized with the change in the value of the parameter of the powertrain.

5. The electric vehicle as defined in claim 1, wherein the controller is configured to cause the second visual indication to be provided when the power limit is visually indicated on the power indicator.

6. The electric vehicle as defined in claim 1, wherein the first visual indication and the second visual indication are of a same color corresponding to an alert level associated with the power limit.

7. The electric vehicle as defined in claim 1, wherein the power limit is indicative of a maximum amount of power that can be output from the powertrain during propulsion of the electric vehicle.

8. The electric vehicle as defined in claim 1, wherein the power limit is indicative of a maximum amount of power that can be generated by the powertrain during regenerative braking.

9. The electric vehicle as defined in claim 1, wherein:
the controller is operatively connected to the powertrain; and
the controller is configured to control the powertrain to restrict the power that can be generated by the powertrain to the power limit.

10. The electric vehicle as defined in claim 1, wherein the controller is configured to cause a notification of the parameter of the powertrain to be provided to the operator of the electric vehicle when the power limit is visually indicated by the power indicator.

11. The electric vehicle as defined in claim 1, wherein:
the power limit is a first power limit; and
the controller is configured to, when a second power limit on the power that can be generated by the powertrain is active and is more restrictive than the first power limit, cause the power indicator to:
cease to visually indicate the first power limit along the scale of the power indicator; and
cause the power indicator to visually indicate the second power limit along the scale of the power indicator.

12. The electric vehicle as defined in claim 11, wherein:
the parameter is a first parameter; and
the second power limit is associated with a second parameter of the powertrain different from the first parameter.

13. The electric vehicle as defined in claim 12, wherein the controller is configured to cause a notification of the second parameter of the powertrain to be provided to the operator of the electric vehicle when the second power limit is visually indicated by the power indicator.

14. The electric vehicle as defined in claim 11, wherein the second power limit is associated with an operating mode of the electric vehicle.

15. The electric vehicle as defined in claim 1, wherein:
the change in the power limit includes a change from a first limit value to a second limit value different from the first limit value; and
the controller is configured to:
visually indicate the change in the power limit using a visual indication;
when the visual indication indicates the first limit value, cause the visual indication to be shown in a first color corresponding to a first alert level; and
when the visual indication indicates the second limit value, cause the visual indication to be shown in a second color corresponding to a second alert level, the second color being different from the first color.

16. The electric vehicle as defined in claim 1, wherein the parameter of the powertrain includes a temperature of the battery.

17. The electric vehicle as defined in claim 1, wherein the parameter of the powertrain includes a temperature of the electric motor.

18. The electric vehicle as defined in claim 1, wherein the parameter of the powertrain includes a state of charge of the battery.

19. The electric vehicle as defined in claim 1, wherein the first scale value and the second scale value represent a range of power output levels available during unrestricted operating conditions of the electric vehicle.

20. A method of controlling an electric vehicle, the method comprising:
sensing a parameter of a powertrain of the electric vehicle, the powertrain including an electric motor for propelling the electric vehicle and a battery for powering the electric motor;
displaying, on an instrument panel of the electric vehicle having a scale extending between a first scale value and a second scale value, an amount of power generated by the powertrain along the scale, the second scale value being larger than the first scale value;
when the parameter is indicative of a non-normal condition of the powertrain:
restricting power that can be generated by the powertrain to a power limit selected to mitigate the non-normal condition, the power limit being variable as a function of the non-normal condition;
dynamically displaying, on the instrument panel of the electric vehicle along the scale between the first scale value and the second scale value, the power limit of the electric vehicle to reflect a variation of the non-normal condition; and
dynamically displaying, on the instrument panel of the electric vehicle, a visual indication alerting an operator of the electric vehicle of the parameter of the powertrain causing the power limit to be applied.

21. A power indicator for visually indicating a real-time amount of power generated by a powertrain of an electric vehicle, the power indicator comprising:
a scale extending between a first scale value and a second scale value, the second scale value being larger than the first scale value;
a first visual indication indicating the real-time amount of power generated by the powertrain;
a second visual indication dynamically indicating, along the scale between the first scale value and the second scale value, a variable power limit on the power that can be generated by the powertrain, the variable power limit being variable as a function of a variable operating parameter of the powertrain; and
a third visual indication alerting an operator of the electric vehicle by dynamically indicating the variable operating parameter of the powertrain causing the variable power limit to be applied.

* * * * *